United States Patent [19]
Gruwez

[11] Patent Number: 5,316,048
[45] Date of Patent: May 31, 1994

[54] ARRANGEMENT FOR SEPARATION AND RE-ASSEMBLY OF A TWO-PART WEAVING MACHINE

[75] Inventor: Marc Gruwez, Zwalm, Belgium
[73] Assignee: Picanol N.V., Belgium
[21] Appl. No.: 21,596
[22] Filed: Feb. 24, 1993

[30] Foreign Application Priority Data
Feb. 27, 1992 [BE] Belgium .............................. 09200198

[51] Int. Cl.⁵ ............................................ D03D 49/02
[52] U.S. Cl. ..................................... 139/1 R; 403/338
[58] Field of Search ............. 139/1 R; 242/56 R, 58.6; 29/525.1; 403/335, 338; 411/354, 355

[56] References Cited
U.S. PATENT DOCUMENTS

| | | | |
|---|---|---|---|
| 2,705,022 | 3/1955 | Picanol | 139/1 R |
| 3,978,574 | 9/1976 | Stith, Jr. | 29/525.1 |
| 4,500,275 | 2/1985 | Ruhl . | |
| 4,934,413 | 6/1990 | Yao . | |
| 5,014,754 | 5/1991 | Vandeweghe et al. | 139/1 R |
| 5,224,518 | 7/1993 | Lefever et al. | 139/1 R |

FOREIGN PATENT DOCUMENTS

| | | | |
|---|---|---|---|
| 298032 | 4/1972 | Austria . | |
| 0247968 | 3/1987 | European Pat. Off. | 139/1 R |
| 62-133150 | 6/1987 | Japan . | |
| 3-206154 | 9/1991 | Japan . | |
| 668608 | 1/1989 | Switzerland . | |

Primary Examiner—Andrew M. Falik
Attorney, Agent, or Firm—Bacon & Thomas

[57] ABSTRACT

A two-part weaving machine includes lamellar side parts in both portions of the machine frame. The side parts are fitted with mutually associated, essentially horizontal rest surfaces and with mutually associated, essentially vertical stop surfaces. In addition, a tightening system containing tightening wedges is provided for each machine side to press the stop surfaces of the side parts against each other.

9 Claims, 6 Drawing Sheets

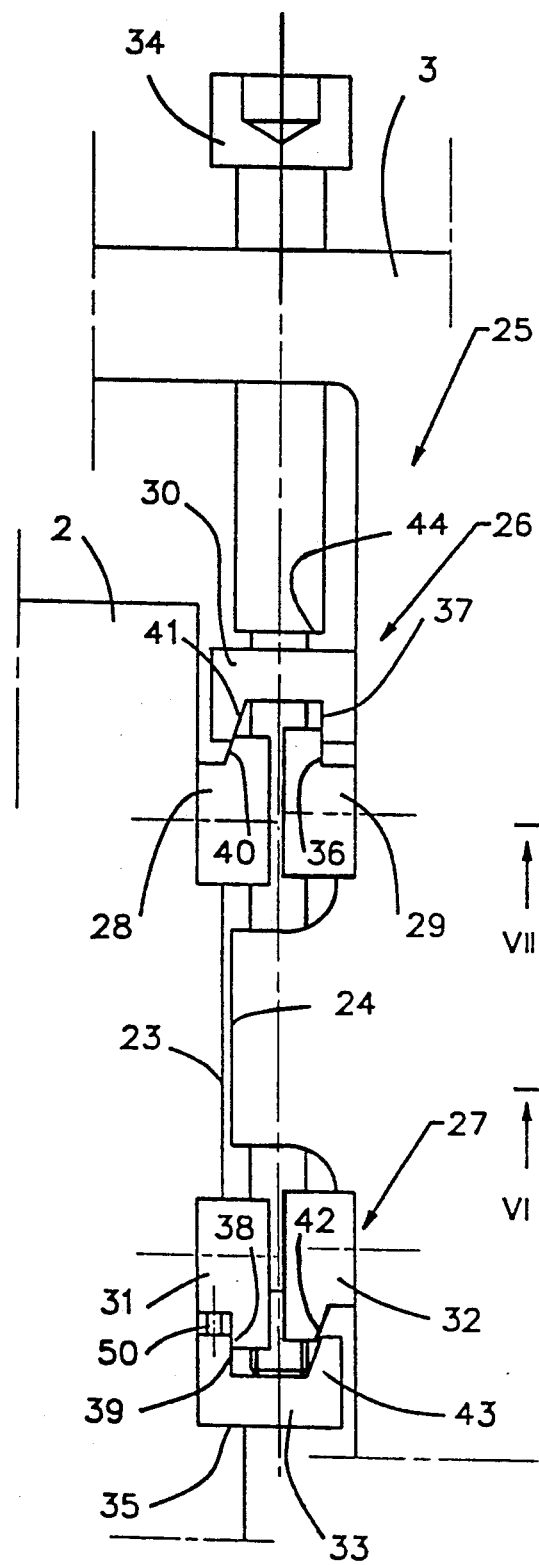
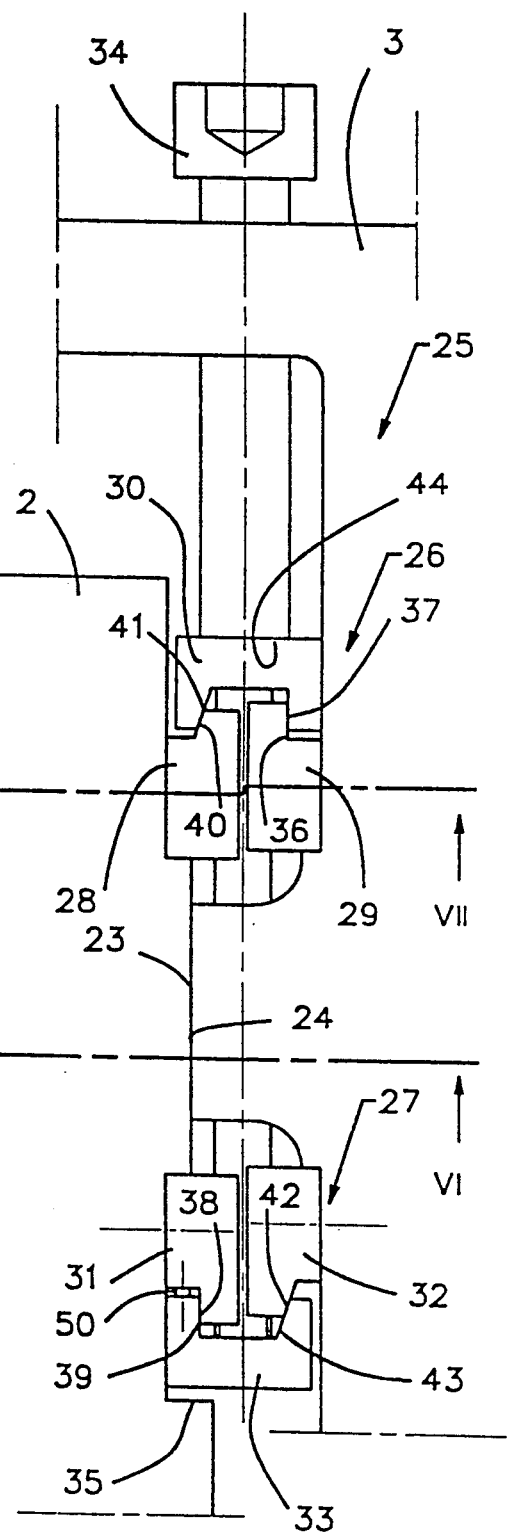

ARRANGEMENT FOR SEPARATION AND RE-ASSEMBLY OF A TWO-PART WEAVING MACHINE

FIELD OF THE INVENTION

The invention concerns a weaving machine which includes a stationary first machine frame section containing at least means for winding up woven material, and a second machine frame section which is removable from the first section and contains at least the bearing for a warp beam.

DESCRIPTION OF RELATED ART

To avoid being forced to work in the cramped conditions of a weaving-machine room after a warp beam has run out or when changing the material being processed and/or the fabric to be produced, it is known from Swiss patent document 668,608 A5 to either move the entire weaving machine by means of a bridge crane to another working area or to divide the weaving machine into two parts and to move only one of the two parts into the other working area. The latter two-part design includes a stationary part with a harness drive, a batten drive, a drive for a takeoff system and a complete woven material windup system. The removable machine-frame part includes a warp beam with its associated drive, a harness system, a batten and a takeoff system for the finished product. When separating the two parts, the connections between the harness system, the batten and the takeoff system to the particular drives are severed and must be re-established when the removable part is later re-assembled to the weaving machine.

The two weaving machine parts must be joined together very rigidly because of operational machine vibration. Such a rigid connection between the two weaving-machine parts is possible using bolts. The use of bolts entails, however, very precise mutual alignment of the bolt-holes of the two weaving-machine parts during assembly. Moreover a large number of bolts is required, at least some of which must be mounted in places not easily accessed. Consequently, connection of the parts of a two-part weaving machine required when removing the removable weaving-machine part and when re-assembling it is both complex and time-consuming.

SUMMARY OF THE INVENTION

It is accordingly an objective of the invention to provide a two-part weaving machine in which the separation and re-assembly of the two weaving-machine parts can be carried out simply and quickly, and yet with accurate alignment of the respective weaving-machine parts.

This objective is achieved by providing a two-part weaving machine in which both portions of the machine frame include side parts provided with mutually associated rest means and with mutually associated stop surfaces, and in which tightening devices including tightening wedges are provided for each side of the machine in order to press the stop surfaces of the side parts against each other.

The invention offers the advantage that when assembling or separating the two machine parts, only a few easily accessed components need to be worked on. Furthermore, the invention offers the advantage that when assembling the very heavy machine parts, their motion does not demand excessive precision because the tightening systems ensure self-alignment.

In one embodiment of the invention, the tightening wedges mounted above and below the stop surfaces comprise a common tightening component running essentially parallel to the stop surface an accessible at the top side of one of the side parts. As a result, only one tightening component mounted in an easily accessed manner is required for each machine side.

In a further embodiment of the invention, a stationary side part is fitted with two upward-pointing, hook shaped or mutually keyed wedge components and a movable side part is fitted with two downward pointing, hook-shaped or mutually keyed wedge components, each side part including a movable and a stationary wedge component. As a result it is possible to assemble the two machine sections by means of a vertical motion just sufficient to cause the wedge components to engage each other, final alignment being implemented by tightening the wedge components. Similarly, release of the two machine sections from each other is also accomplished initially, by a simple vertical motion.

BRIEF DESCRIPTION OF THE DRAWINGS

Further features and advantages of the invention are elucidated in the following description of an illustrative embodiments shown in the drawing.

FIGS. 3 through 5 are sideviews of a tightening system containing tightening wedges to compress vertical stop surfaces during assembly of the two weaving-machine parts.

DETAILED DESCRIPTION OF THE PREFERRED EMBODIMENTS

Figure 1:
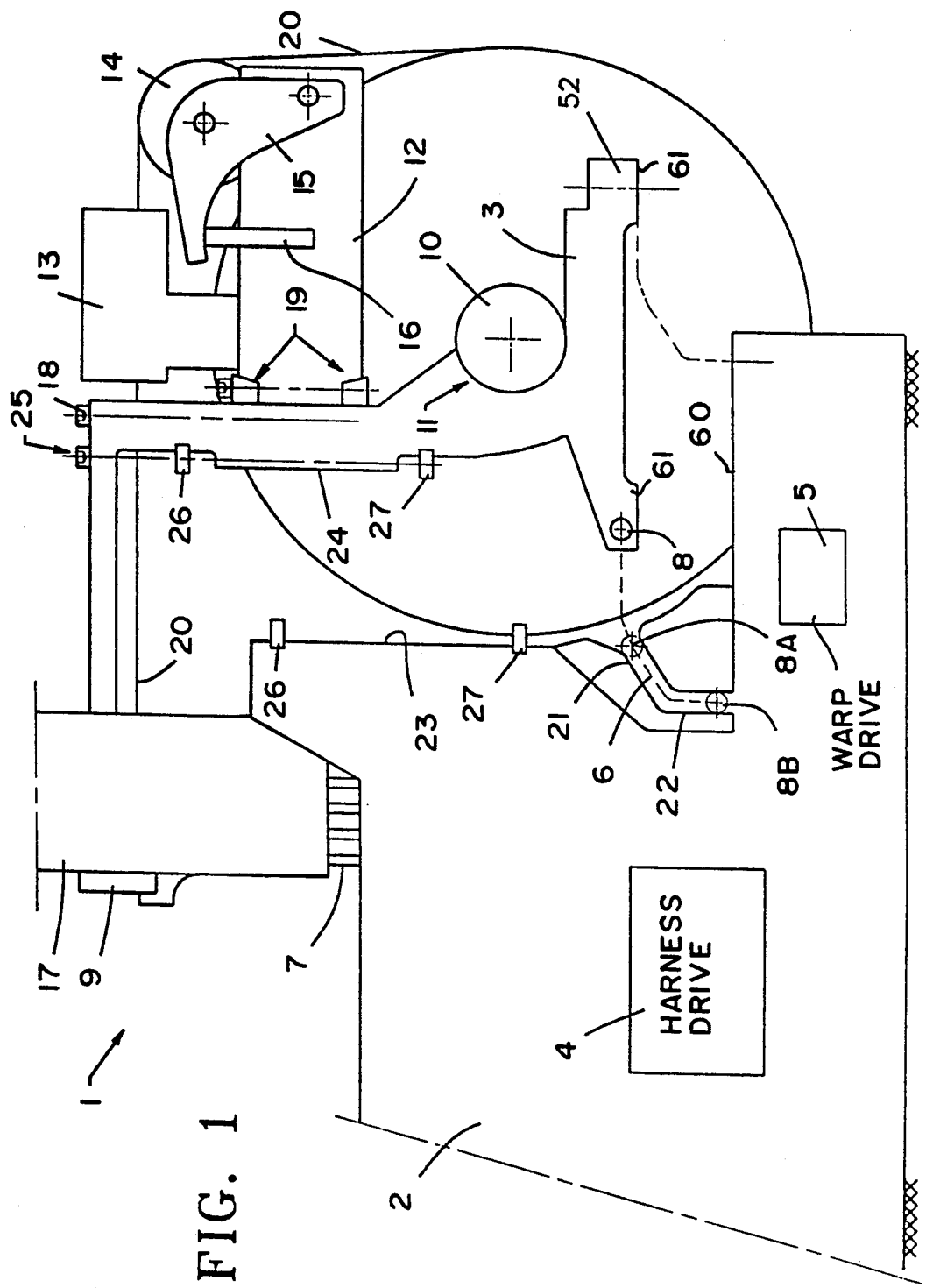
FIG. 1 is a partial sideview of a two-part weaving machine of the invention, while assembling the two separated parts.
Figure 2:
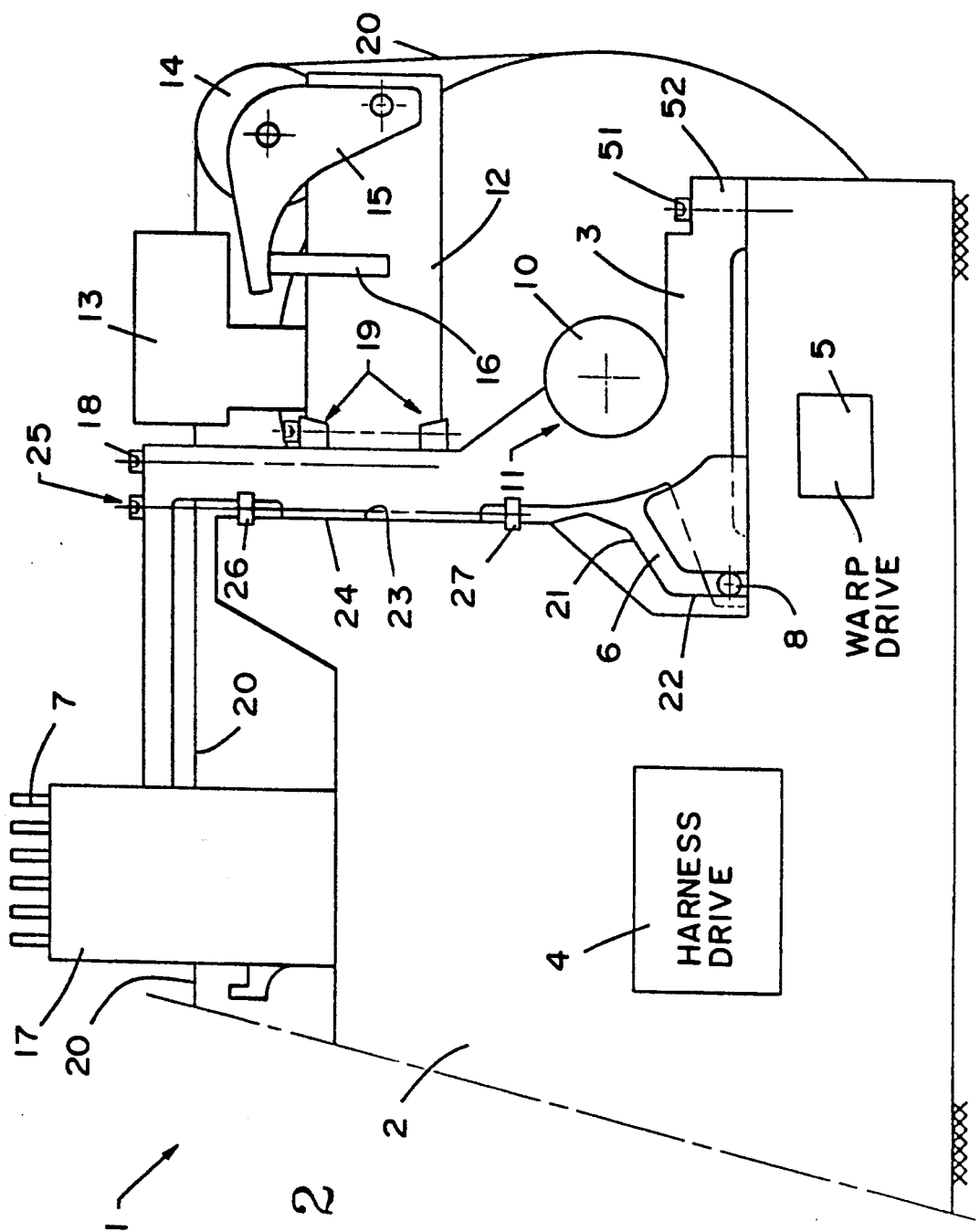
FIG. 2 is a sideview of the machine corresponding to FIG. 1, after assembly.

The weaving machine 1 shown in FIGS. 1 and 2 includes a stationary part, the machine frame of which includes two stationary lamellar side parts 2 connected to each other by cross-braces or the like. The weaving machine 1 furthermore comprises a removable part also including two lamellar side parts 3 connected to each other by at least one cross-brace. That part of the machine frame containing the lamellar side parts 2 includes a batten drive (not shown), a material windup system (also not shown), a schematically shown harness drive 4 and a warp-beam drive 5. The machine-frame part including the side parts 3 also houses a bearing 11 for the warp beam 10, further a bracket 12 which is adjustable in height on an essentially vertical leg by a setting system 18, 19. This bracket 12 bears by means of a rocker 15 a deflection roller 14 for the warps 20. The rocker 15 is supported by a spring 16. Moreover, warp motion stops 13 are mounted to the support 12. An essentially horizontal arm of the side part 3 projecting above the stationary machine portion comprises harness guides 17 for harnesses 7. The harness guides also include a holding means for receiving a batten 9 released from the batten drive.

The stationary and the removable side parts 2 and 3 respectively include horizontal rest surfaces 60, 61 and vertical stop surfaces 23, 24 at which the side parts 2, 3 are rigidly joined in the operational position. The horizontal rest surfaces 61 are divided by a clearance into two segments. However, it will be appreciated that the rest surfaces 60, 61 and the stop surfaces 23, 24 need not be horizontal or vertical to be functional. In another embodiment of the invention, instead of rest surfaces the foot parts of the side parts 3 include only a preferably rounded rest rib.

A constrained path-guidance is provided for the assembly of the side parts 2, 3 and also for the separation of these side parts 2, 3, such that the removable part must carry out a specified assembly or removal motion while the warp beam 10 and the harnesses 7 extend into the stationary machine part in order to avoid collisions between respective parts of the stationary and movable parts. For that purpose, the stationary side part 2 comprises lamellar guide components with a specific guide groove 6 for pins 8 of the side parts 3. The guide groove 6 comprises a first segment 21 extending obliquely downward and an adjoining segment 22 running parallel to the stop surfaces 23. During assembly, the pins 8 sequentially assume the positions 8A and 8B. At the end of the assembly motion, the rest surfaces 61 of the side parts 3 are supported by the rest surfaces 60 of the side parts 2, whereas the stop surfaces 23, 24 of these side parts 2 and 3 still are a slight distance from one another. The play between the pins 8 and the grooves 6 corresponds at least to the slight distance.

The final position wherein the stop surfaces 23, 24 of the side parts 2 and 3 are pressed against each other is achieved using a tightening system 25 which pulls the side parts 2, 3 together and presses their stop surfaces 23, 24 against each other. The tightening system 25 is discussed in greater detail later in relation to FIGS. 3 through 8, which show tightening wedges 26, 27 mounted above and below the stop surface 24. Once the stop surfaces 23, 24 of the side parts 2, 3 have been pressed against each other, the foot 52 provided with the two segments of rest surface 61 engaging rest surface 60 of the side parts 3, is affixed by a bolt 51 to the side part 2 at the end away from the tightening system 25.

In the region of the stop surface 23, the stationary side parts 2 include two hook-shaped or mutually keyed upwardly pointing wedge components 28, 33. The movable side parts 3 also include hook-shaped or mutually keyed wedge components 30, 32 pointing down so that during assembly, when the side part 3 is moved vertically, the wedge components 28 and 30 on the one hand and the wedge components 32 and 33 on the other hand engage, whereas during separation, they disengage following a vertical motion.

The wedge component 28 is permanently affixed by screws 46 to the stationary side part 2. It includes a wedging surface 40 running obliquely upward and toward the outside. The wedge component 33 also includes a wedging surface 43 running obliquely upward and to the outside and is displaceably affixed to the stop surface 23 on the side part 2. A guide component 31 is affixed by screws to the side part 2 and includes a clearance 38 which together with a wall of the side part 2 forms a guide for a leg 39 of the wedge component 33. The motion toward the stop surface 23 is limited by a fitting 35 of the side part 2. Lateral displacement of the wedge component 33 relative to the guide component 31 is prevented by a pin guide 50.

Figure 7:
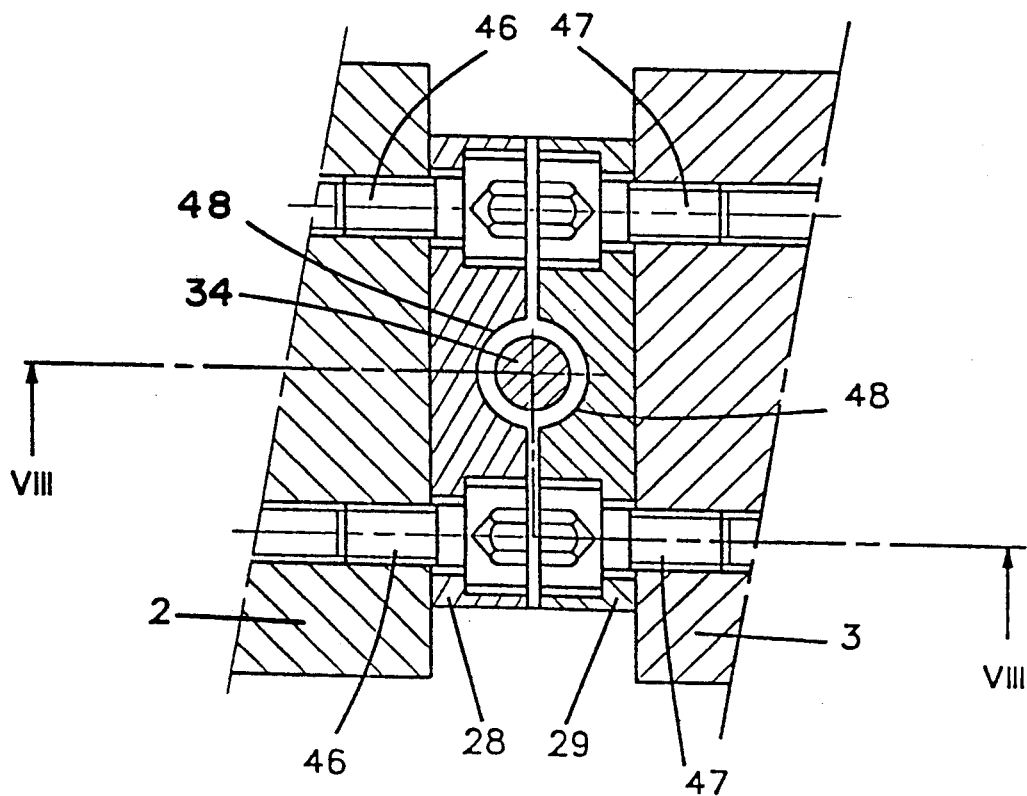
FIG. 7 is a section along line VII—VII of FIG. 5.
Figure 8:
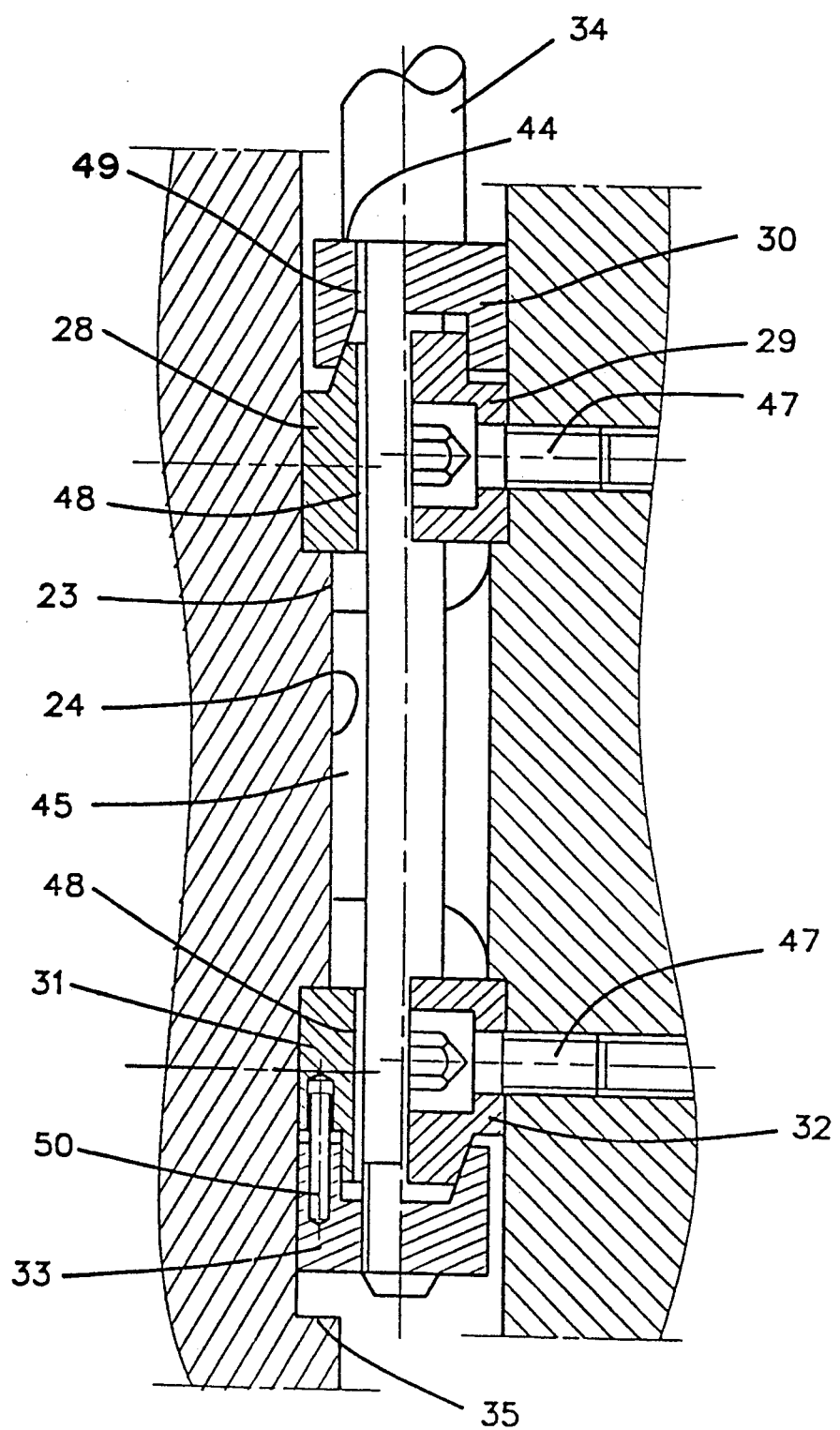
FIG. 8 is a section along line VIII—VIII of FIG. 7.

The wedge component 32 is affixed in stationary manner to the removable side part 3 by screws 47 shown in FIGS. 7 and 8. This wedge component 32 includes a wedge surface 42 pointing downward and oblique relative to a rest stop surface 24. The wedge component 30 also includes a downward pointing wedge surface 41 slanting relative to the rest surface 24 and affixed to the side part 3 so as to be displaceable toward the stop surface 24. A guide component 29 is affixed by screws 47 shown in FIG. 8 to the side part 3 and includes a clearance 36 which together with one wall of the side part 3 constitutes a guide for a ridge 37 of the wedge component 30.

The two movable wedge components 30 and 33 are displaced toward each other by a common screw 34. The screw 34 runs parallel to the stop surfaces 23, 24 and is guided in a through-borehole of the removable side part 3 so that its head is accessible at the top side of this side part 3. The screw 34 passes through a borehole 49 in the wedge component 30. The wedge component 33 includes a threaded borehole into which the screw 3 can be threaded (FIG. 8). At the upper outside of the wedge component 30, the screw 34 includes an annular shoulder 44 of substantial diameter. The stationary wedge components 28, 32 and the stationary guide components 31, 29 comprise guide grooves 48 limiting the transverse excursion of the screw 34.

Figure 6:
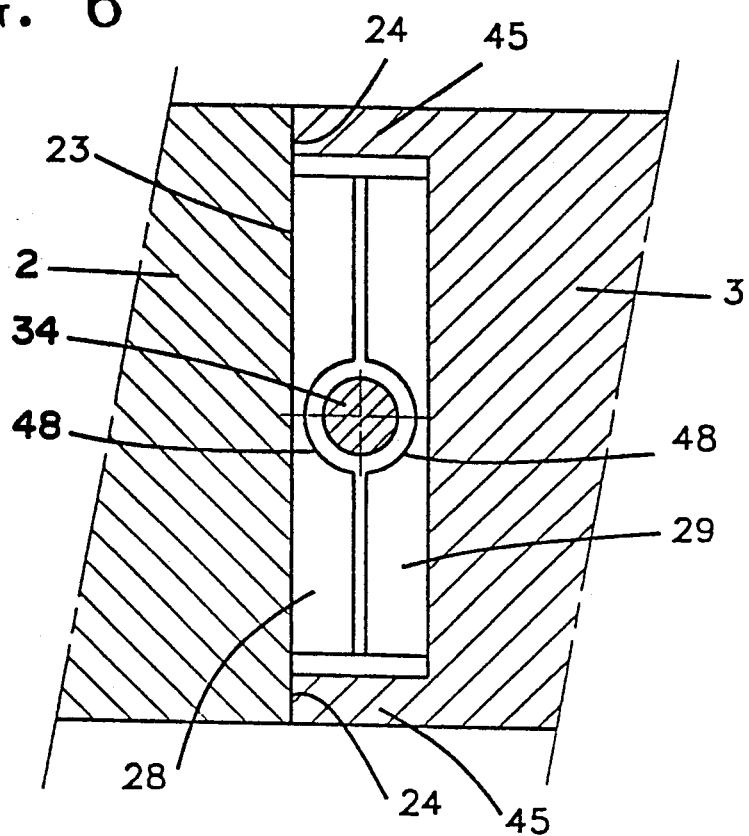
FIG. 6 is a section along line VI—VI of FIG. 5.

The stop surface 24 of the removable side part 3 includes a clearance which divides the surface into two parallel segments formed by crossbars 45, as shown in FIG. 6. The spacing of the crossbars 45 is larger than the width of the wedge components 28, 30, 32, 33 and of the guide components 29, 31, and therefore the vertical motion of the side part 3 is not hampered by the tightening system 25.

Figure 3:
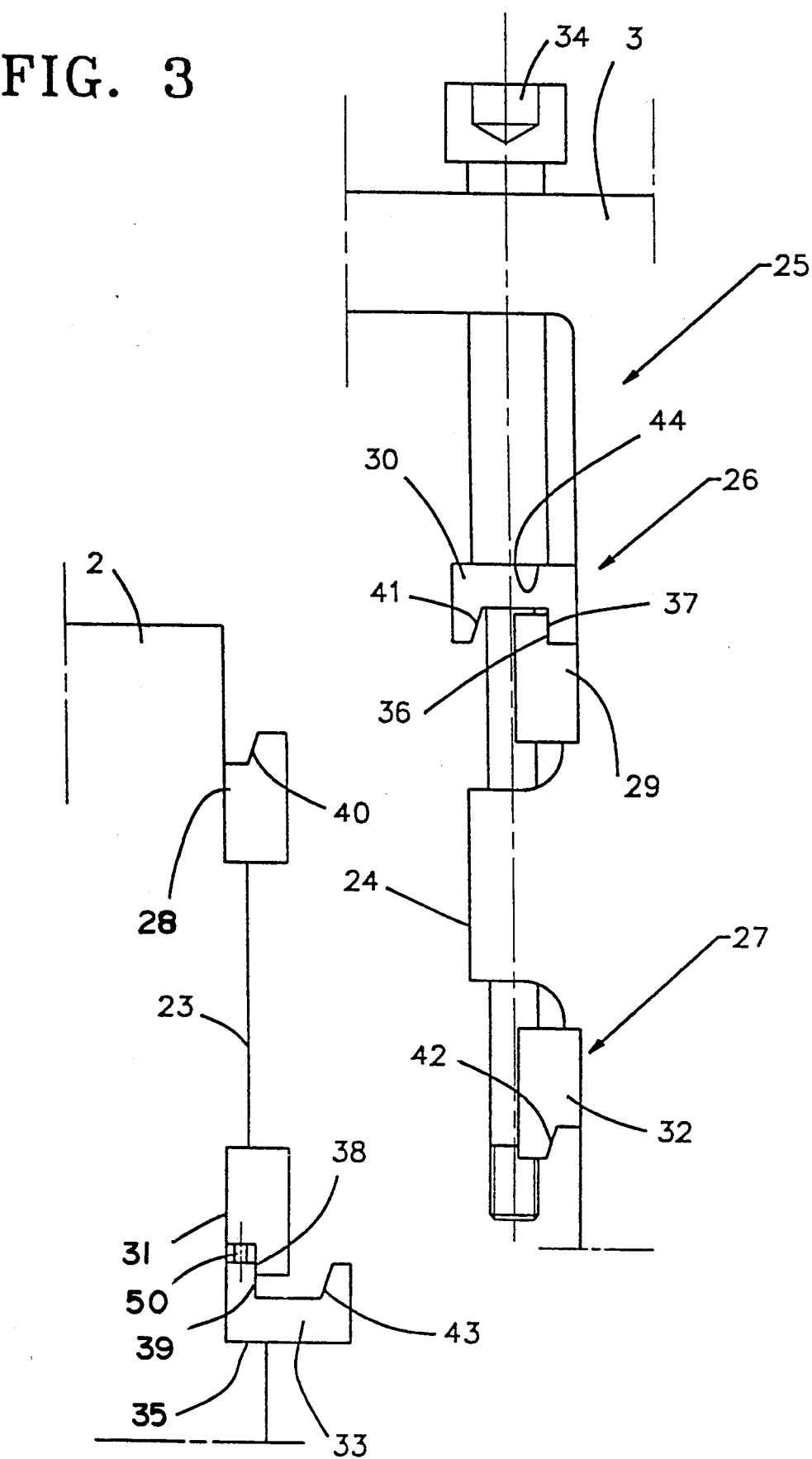

The components of the tightening system 25 will be initially in the position shown in FIG. 3 during the closing motion for the re-assembly of the side parts 2, 3. Because of the guide groove 6 and the journals 8, the last segment of the reassembly motion is essentially vertical and parallel to the stop surfaces 23, 24. When the rest surfaces 61 of the side parts 3 rest on the support surfaces 60 of the side parts 2, the stop surfaces 23, 24 and the tightening system 25 are in the position shown in FIG. 4, the stop surfaces 23, 24 being a slight gap apart. The screw 34 rests on the wedge component 33, having been lifted from its position shown in FIG. 3. The wedge component 30 has come to rest by its wedge surface 41 against the wedge surface 40 of the wedge component 28, and the wedge component 32 is positioned by its wedge surface 42 against the wedge surface 43 of the wedge component 33. To obtain that position, screw 34 is threaded into the threaded borehole of the wedge component 33. By turning the screw 34 into the thread, the displaceable wedge components 30, 33 are moved in opposite directions. The wedge component 33 is pulled upward, while the wedge component 30 is forced downward by the annular shoulder 44 of the screw 34. In the process, the wedge surfaces 40, 41 and 42, 43, subtending an angle of about 20° with the stop surfaces 23, 24, will slide toward each other and pull the stop surface 24 against the stop surface 23. By suitably tightening the screws 34, a highly reliable connection is achieved in the zone of the stop surfaces 23, 24 between the parts 2 and 3.

In order to make possible the separation of the side parts 2, 3, the screws 34 are turned out of the wedge components 33 and thereupon the part of the weaving machine having the side parts 3 can be separated by following the predetermined guidance path.

The above described clamping of the side parts 2, 3 offers the advantage that side parts 2, 3 are arranged at a mutually suitable angle. This is especially advantageous when, as in the illustrated embodiment, the harness guides 17 are held by the side parts 3 of the removed portion of the machine frame whereas the harness drive 4 is mounted in the stationary portion of the weaving machine. This connection is implemented with high accuracy even though comparatively large tolerances are allowable for mounting the wedge components 28, 30, 32, 33. A previous accurate and parallel alignment of the stop surfaces 23, 24 is not required when re-assembling the weaving machine portions because such alignment takes place automatically when closing the tightening systems 25. Advantageously, only one screw 34 is required for the tightening system 25, of which the screw head moreover is located in an easily accessible position, namely at the top side of the side parts 3.

A variation of the above-described embodiment provides for a screw with two opposite-sense threaded segments, the wedge component 30 being mounted on one of these threaded segments. In this manner it is possible again to achieve opposite displacements of the two wedge components 30, 33. Further, the guidance of the movable wedge components 30, 33 may be modified, and illustratively, wedge surfaces may be provided in the region of the guide grooves. These, and other modifications of the invention which will occur to those skilled in the art are all intended to be included within the scope of the invention and, consequently, the above description and illustrations should not be taken as limiting in any way, the invention being defined solely in accordance with the appended claims.

I claim:

1. In a two-part weaving machine comprising a machine frame which includes stationary first part containing a means for winding up woven material, and a removable second part containing a bearing for a warp beam, the improvement wherein said stationary and removable parts of the machine frame comprise side parts fitted with respective stop surfaces, and further comprising tightening means including tightening wedges for pressing the stop surfaces of the side parts against each other.

2. A weaving machine as claimed claim 1, where the tightening wedges are mounted above and below the stop surfaces, and stop surfaces being essentially vertical.

3. A weaving machine as claimed in claim 1, further comprising a common tightening component for the tightening wedges mounted above and below the stop surfaces, essentially parallel to the stop surfaces, and accessible at a top side of one of the side parts.

4. A weaving machine as claimed in claim 1, wherein the tightening wedges each consist of a pair of wedge components and means for holding one wedge component in stationary manner at one side part and the other wedge component displaceably parallel to the stop surface at the other side part.

5. A weaving machine as claimed in claim 4, wherein the movable wedge components can move relative to each other by means of a common tightening component.

6. A weaving machine as claimed in claim 4, wherein the stop surfaces of one of the side parts includes a clearance wider than a width of the wedge components.

7. A weaving machine as claimed in claim 6, wherein a screw guided in an arm of the removable side parts is the tightening component, and wherein the screw is arranged to be threaded into the lower, movable wedge component of the stationary side parts, said screw passing through the movable wedge components of the removable side parts and being fitted with an annular shoulder corresponding to the wedge component.

8. A weaving machine as claimed in claim 7, wherein the wedge components mounted in a stationary manner are fitted with a guide groove for the screw.

9. A weaving machine as claimed in claim 1, wherein the stationary side part is fitted with two hook-shaped, upwardly pointing wedge components and wherein the removable side part is fitted with two hook-shaped downward-pointing wedge components, each side part comprising one movable and one stationary wedge component.

* * * * *